May 22, 1951 R. E. BRADLEY ET AL 2,554,291
BRAKE ACTUATING MECHANISM
Filed Dec. 21, 1945 2 Sheets-Sheet 1

INVENTOR.
R. E. BRADLEY.
HAROLD FISHER.
BY
T. J. Plante
ATTORNEY.

May 22, 1951 R. E. BRADLEY ET AL 2,554,291
BRAKE ACTUATING MECHANISM
Filed Dec. 21, 1945 2 Sheets-Sheet 2

INVENTOR.
R. E. BRADLEY
HAROLD FISHER
BY
T. J. Plante
ATTORNEY.

Patented May 22, 1951

2,554,291

UNITED STATES PATENT OFFICE 2,554,291

BRAKE ACTUATING MECHANISM

Ronald E. Bradley and Harold Fisher, South Bend, Ind., assignors to Bendix Aviation Corporation, South Bend, Ind., a corporation of Delaware Application December 21, 1945, Serial No. 636,344

7 Claims. (Cl. 188—78)

This invention relates to brake actuating mechanism comprising mechanical means for spreading apart the adjacent separable ends of brake shoes in a brake of the internal shoe type.

In Gallup Patent No. 2,118,188 there is shown mechanical linkage for actuating a pair of brake shoes comprising a lever which swings in a plane perpendicular to the plane of the backing plate and which acts directly on one of the shoes and through a thrust element or strut on the other shoe. The arrangement shown in the aforesaid patent provides a very simple and inexpensive means for spreading the shoes mechanically, but there is one disadvantage in that the sliding friction between the shoe spreading mechanism and the backing plate results in a certain loss in brake effectiveness.

The primary object of the present invention is to improve the operating efficiency of mechanical brake actuating means of the type discussed above by reducing the friction between the backing plate and that portion of the shoe spreading mechanism which rests against and is guided by said backing plate.

These and other objects and features of the invention will become apparent from the following description. In the drawings.

Figure 1:
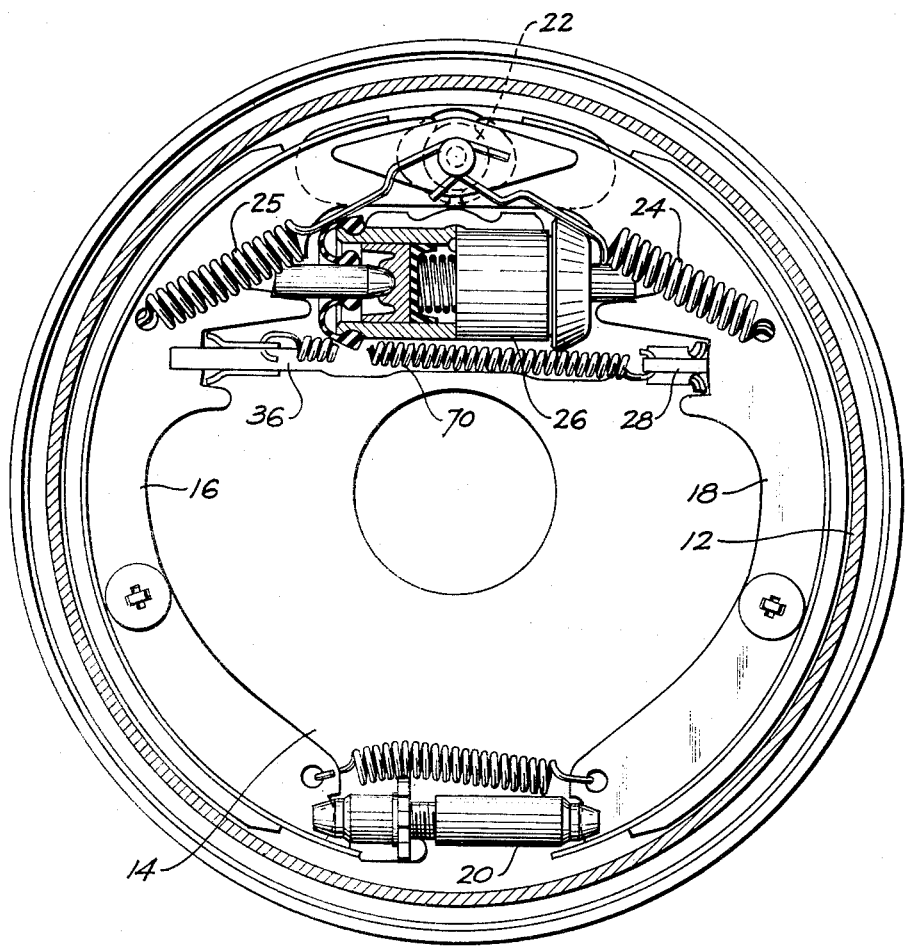
Figure 1 is an elevational view showing a brake assembly which incorporates the improved mechanical shoe spreading means.

The present invention is not primarily concerned with the arrangement of the brake shoes or the particular characteristics of operation thereof. For purposes of illustration only, I have illustrated a brake assembly comprising: a rotatable brake drum 12, a non-rotatable backing plate or support member 14, two brake shoes 16 and 18 which are interconnected by a floating adjuster 20, an abutment 22 against which either one or the other of the shoes is adapted to anchor depending upon the direction of rotation of the drum, return springs 24 and 25 which normally retain the shoes in released position, a hydraulic actuator 26 intended to be used in the normal or service applications of the brake, and mechanical linkage, which will be hereinafter described in detail, arranged to act as an auxiliary brake applying means.

Figure 4:
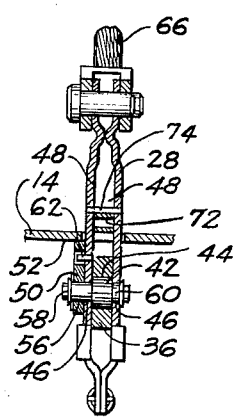
Figure 4 is a section taken on the line 4—4 of Figure 2.

The mechanical brake applying linkage with which the present invention is primarily concerned comprises a lever 28 which is arranged to be rotated or swung in a plane substantially perpendicular to the plane of the backing plate 14, an opening 30 being provided in the backing plate, through which the lever 28 extends. Surface 32 of lever 28 is in pivotal contact with the web 34 of brake shoe 18, and is adapted to act on said shoe to force the same against the brake drum 12. A strut or thrust member 36 is pivotally connected at one end to lever 28 and extends across the brake assembly to contact, as at surface 38, the web 40 of shoe 16. Pivotal connection between the lever 28 and strut 36 may be provided by a pivot pin 42 extending through an opening 44 in strut 36, and through openings 46 provided in the spaced sides 48 of lever 28, it being noted that a double lever construction is used, the parallel interconnected portions of which are arranged to straddle the strut 36, as illustrated in Figure 4. By making the diameter of opening 44 somewhat greater than the diameter of openings 46, and providing a stepped pivot pin construction, as shown, retention of the pin in the proper position is insured.

In order to support the mechanical actuating linkage on the backing plate and at the same time reduce frictional resistance to operation of said linkage, a rocker 50 is provided which rides on the inner wall 52 of the backing plate. The rocker preferably has, as illustrated, the form of a sectoral or segmental part of a roller, the curved surface 54 of the rocker being arranged to roll on the backing plate as the rocker moves with respect to said plate. The rocker 50 is rockably mounted on pivot pin 42, an opening 56 in the rocker being provided to receive the pin. The ends 58 and 60 of the pin may be sheer riveted, as shown, to retain the assembled parts in position. The rocker 50 and lever 28, although arranged to pivot about the same axis, must be free to rotate independently after the rocker, lever and strut have been assembled. To limit excessive rotational movement of the rocker with respect to the lever, a lateral nib 62 on the lever extends into an arcuate slot 64 in the rocker.

Figure 2:
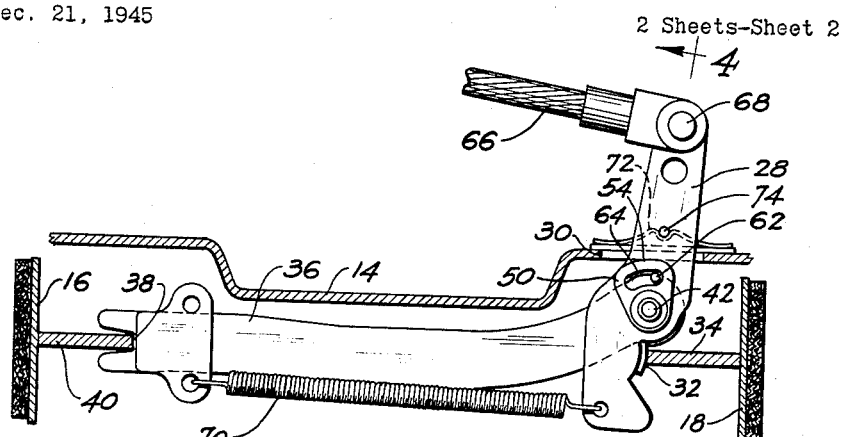
Figure 2 is a plan view of the mechanical shoe spreading means in released position.

A tension link such as the cable 66 is connected to the outer end of the lever at 68. The lever and strut assembly is normally retained in released position, as shown in Figure 2, by means of a spring 70, as well as the return springs 24 and 25.

In order to hold the curved surface 54 of rocker 50 in contact with surface 52 of the backing plate, a leaf spring 72 urges the pivot pin and rocker toward the backing plate, the leaf spring being supported on the backing plate and acting against a cotter pin 74 which extends through an opening pierced in lever 28. This spring develops a certain frictional resistance against actuation of the mechanical linkage, and an additional frictional resistance results from a component of the load on cable 66.

Figure 3:
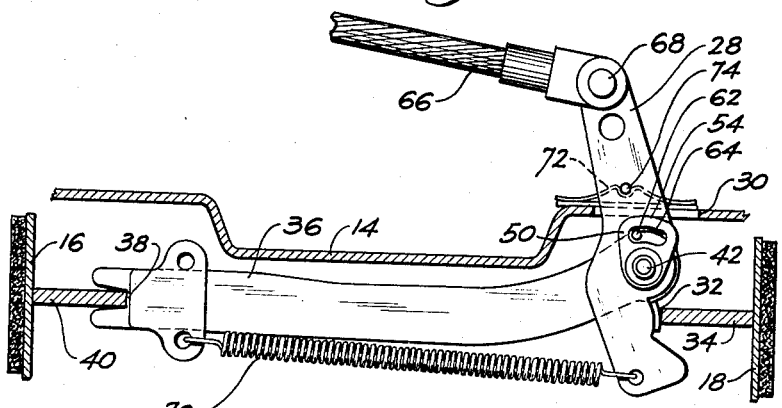
Figure 3 is a plan view of the mechanical shoe spreading means showing the parts in the positions they assume after the linkage has been moved to applied position.

The operation of the mechanical brake actuating linkage is as follows. When the operator wishes to apply the brakes by the auxiliary mechanism, he exerts a force tending to draw cable 66 toward the left (as viewed in Figures 2 and 3). This results in a counterclockwise rotation of lever 28. Rotation of the lever exerts a direct force against shoe 18 and also exerts a force through strut 36 against shoe 16, separating or spreading the upper ends of said shoes to bring them into contact with the brake drum and impede the rotation thereof. In analyzing the action of lever 28, pivot pin 42 may be considered as a temporary fulcrum about which the lever rotates to cause surface 32 to move shoe 18 outwardly. Likewise, surface 32 of the lever may be considered as a temporary fulcrum about which lever 28 moves to move the floating pin 42 and exert force therethrough on strut 36, which in turn acts against shoe 16. This action of lever 28 causes pivot pin 42 to move toward the left (as viewed in Figures 2 and 3), and during this motion the arcuate surface 54 of rocker 50 rolls on the surface of the backing plate, thereby minimizing the frictional opposition to movement of strut 36. When the shoes are in full engagement with the drum, the linkage will have assumed approximately the position shown in Figure 3.

Although a particular embodiment of our invention has been described, it will be understood by those skilled in the art that the object of the invention may be attained by the use of constructions different in certain respects from that disclosed without departing from the underlying principles of the invention. We therefore desire by the following claims to include within the scope of our invention all such variations and modifications by which substantially the results of our invention may be obtained through the use of substantially the same or equivalent means.

We claim:

1. In a brake including a backing plate and two shoes mounted on the backing plate and having adjacent separable ends, mechanical actuating means for urging apart the separable ends of the shoes comprising a strut having one end operatively engaging the first shoe and the other end extending toward the second shoe, said strut having an opening therethrough adjacent said other end, a lever which rotates in a plane normal to the plane of the backing plate and which extends through said backing plate, said lever being in operative engagement at one point with the second shoe and having an opening therethrough spaced from said point of engagement, a rocker having a curved surface riding on the inner surface of the backing plate and having an opening therethrough at a distance from said curved surface, a pivot pin extending through the openings provided in the lever, strut, and rocker to provide a common axis of rotation for all three elements, said rocker having an arcuate slot therein, a projection on said lever extending into said slot to limit the movement of the rocker with respect to said lever, resilient means acting on the lever to retain the curved surface of the rocker in contact with the backing plate, and means outside the backing plate connected to the lever to move the same in such a way as to displace the pivot pin and the aforesaid point of engagement of the lever in opposite directions.

2. In a brake including a backing plate and two shoes mounted on the backing plate and having adjacent separable ends, mechanical actuating means for urging apart the separable ends of the shoes comprising a strut having one end operatively engaging the first shoe and the other end extending toward the second shoe, a lever which is arranged to swing in a plane normal to the plane of the backing plate and which extends through said backing plate, said lever being in operative engagement at one point with the second shoe, a pivot pin pivotally connecting the lever and strut, a rocker pivotally mounted on said pivot pin and having an arcuate surface resting against the surface of the backing plate and adapted to rock on the backing plate as the pivot pin moves, said rocker having an arcuate slot therein, a projection on said lever cooperatively associated with said slot to limit the movement of said rocker with respect to said lever, a spring acting on the lever to retain the rocker in contact with the backing plate, and a tension link outside the backing plate pivotally connected to the outer end of the lever to actuate the same.

3. In a brake including a backing plate and two shoes mounted on the backing plate and having adjacent separable ends, mechanical actuating means for urging apart the separable ends of the shoes comprising a strut having one end operatively engaging the first shoe and the other end extending toward the second shoe, a lever which is arranged to swing in a plane substantially normal to the plane of the backing plate and which extends through said backing plate, said lever being in operative engagement at one point with the second shoe, a pivot pin pivotally connecting the lever and strut, a rocker pivotally mounted on said pivot pin and having an arcuate surface resting against the surface of the backing plate and adapted to rock on the backing plate as the pivot pin moves, means for limiting the rotational movement of said rocker with respect to said lever, and a spring acting on the lever to retain the rocker in contact with the backing plate.

4. In a brake including a backing plate and two shoes mounted on the backing plate and having adjacent separable ends, mechanical actuating means for urging apart the separable ends of the shoes comprising a strut having one end operatively engaging the first shoe and the other end extending toward the second shoe, a lever which is arranged to swing in a plane substantially normal to the plane of the backing plate and which extends through said backing plate, said lever being in operative engagement at one point with the second shoe, a pivot pin pivotally connecting the lever and strut, a rocker pivotally mounted on said pivot pin and having an arcuate surface resting against the surface of the backing plate and adapted to rock on the backing plate as the pivot pin moves, said rocker having an arcuate slot therein, a nib on said lever extending into said slot to limit the movement of the rocker with respect to the lever, and a spring acting on the lever to retain the rocker in contact with the backing plate.

5. In a brake including a backing plate and two shoes mounted on the backing plate and having adjacent separable ends, mechanical actuating means for urging apart the separable ends of the shoes comprising a strut having one end operatively engaging the first shoe and the other end extending toward the second shoe, a lever which is arranged to swing in a plane substantially normal to the plane of the backing plate and which extends through said backing plate, said lever being in operative engagement at one point with the second shoe, a floating pivot pin pivotally connecting the lever and strut, a rocker pivotally mounted on said pivot pin and having an arcuate surface resting against the surface of the backing plate and adapted to rock on the backing plate as the pivot pin moves, means for limiting the rotational movement of the rocker with respect to the lever, and a spring acting on the lever to retain the rocker in contact with the backing plate.

6. In a brake including a backing plate and two shoes mounted on the backing plate and having adjacent separable ends, mechanical actuating means for urging apart the separable ends of the shoes comprising a strut having one end operatively engaging the first shoe and the other end extending toward the second shoe, a lever which is arranged to swing in a plane substantially normal to the plane of the backing plate and which extends through said backing plate, said lever being in operative engagement at one point with the second shoe and being pivotally connected to said strut, a friction-reducing member associated with said lever and said strut resting against the surface of the backing plate and adapted to move on the backing plate, means for limiting the rotational movement of the friction-reducing member with respect to said lever, and means acting on said lever to retain the friction-reducing member in contact with the backing plate.

7. In a brake including a backing plate and two shoes mounted on the backing plate and having adjacent separable ends, mechanical actuating means for urging apart the separable ends of the shoes comprising a strut having one end operatively engaging the first shoe and the other end extending toward the second shoe, a lever which is arranged to swing in a plane substantially normal to the plane of the backing plate and which extends through said backing plate, said lever being in operative engagement at one point with the second shoe and pivotally connected to said strut, a rocker supported by the pivotal connection between said lever and said strut and having an arcuate surface engaging the surface of the backing plate and adapted to rock on the backing plate, and means for limiting the rotational movement of the rocker with respect to the lever.

RONALD E. BRADLEY.
HAROLD FISHER.

REFERENCES CITED

The following references are of record in the file of this patent:

UNITED STATES PATENTS

| Number | Name | Date |
|---|---|---|
| 1,992,449 | Sneed | Feb. 26, 1935 |
| 2,006,494 | Bendix et al. | July 2, 1935 |
| 2,069,344 | White | Feb. 2, 1937 |
| 2,118,188 | Gallup | May 24, 1938 |
| 2,287,239 | Goepfrich | June 23, 1942 |